(12) United States Patent
Fujimoto

(10) Patent No.: US 10,423,261 B2
(45) Date of Patent: Sep. 24, 2019

(54) DISPLAY CONTROL DEVICE, DISPLAY CONTROL METHOD, AND IMAGE FORMING APPARATUS

(71) Applicant: KYOCERA Document Solutions Inc., Osaka (JP)

(72) Inventor: Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/925,870

(22) Filed: Mar. 20, 2018

(65) Prior Publication Data

US 2018/0275807 A1  Sep. 27, 2018

(30) Foreign Application Priority Data

Mar. 27, 2017 (JP) .................. 2017-060860

(51) Int. Cl.
  *G06F 3/041* (2006.01)
  *G06F 3/0354* (2013.01)
  *G06F 3/0488* (2013.01)

(52) U.S. Cl.
  CPC ........ *G06F 3/0412* (2013.01); *G06F 3/03547* (2013.01); *G06F 3/0416* (2013.01); *G06F 3/04886* (2013.01)

(58) Field of Classification Search
  CPC .. G06F 3/03547; G06F 3/0412; G06F 3/0416; G06F 3/04886
  See application file for complete search history.

(56) References Cited

U.S. PATENT DOCUMENTS

| | | | |
|---|---|---|---|
| 8,188,976 B2 | 5/2012 | Suzuki et al. | |
| 9,395,914 B2 * | 7/2016 | Chun | ................ G06F 3/04886 |
| 2008/0227499 A1 | 9/2008 | Suzuki et al. | |
| 2014/0325440 A1 * | 10/2014 | Kondo | ................ G06F 3/0488 |
| | | | 715/814 |

FOREIGN PATENT DOCUMENTS

JP  2007-079990 A  3/2007

* cited by examiner

*Primary Examiner* — Nelson M Rosario
(74) *Attorney, Agent, or Firm* — Studebaker & Brackett PC

(57) ABSTRACT

A tablet terminal device includes a display and a controller. The controller includes a detection section, a first determination section, a duration measuring section, a second determination section, and an execution section. The detection section detects an operation position where a touch operation is performed. The first determination section determines whether or not the operation position is located within a first area of a first object. The duration measuring section measures a first operation duration during which the detection section keeps detecting the operation position in the first area. The second determination section determines whether or not the first operation duration is equal to or longer than a first response period. The execution section executes a function assigned to the first object when the first operation duration is equal to or longer than the first response period.

9 Claims, 8 Drawing Sheets

DISPLAY CONTROL DEVICE, DISPLAY CONTROL METHOD, AND IMAGE FORMING APPARATUS

INCORPORATION BY REFERENCE

The present application claims priority under 35 U.S.C. § 119 to Japanese Patent Application No. 2017-060860, filed on Mar. 27, 2017. The contents of this application are incorporated herein by reference in their entirety.

BACKGROUND

The present disclosure relates to a display control device including a display, a display control method, and an image forming apparatus.

A mobile terminal device includes a key placement surface, a touchpad, a controller, and a display section. The key placement surface has a plurality of keys. The touchpad detects a user's touch on each key. When the touchpad detects that the user has touched some of the keys, the controller sequentially displays, on the display section, characters assigned to the keys touched by the user as candidate characters. The controller confirms and determines the candidate characters displayed on the display section when the user does not touch any key for a specific period of time after the touchpad detects that the user has touched the keys.

SUMMARY

A display control device according to an aspect of the present disclosure is a display control device for displaying a plurality of objects on a display. A function is assigned to at least one of the objects. The one object has an area including a first area, a second area, and a third area. The second area is different from the first area. The third area consists of the first area and the second area. The display control device includes a detection section and an execution section. The detection section detects an operation performed in the first area and the third area by a user. The execution section executes the function when a duration during which the detection section keeps detecting the operation has reached a response period. A first response period is used as the response period when the operation is performed in the first area. A second response period is used as the response period when the operation is performed in the third area. The first response period is shorter than the second response period.

A display control method according to another aspect of the present disclosure is a display control method for displaying a plurality of objects on a display. A function is assigned to at least one of the objects. The one object has an area including a first area, a second area, and a third area. The second area is different from the first area. The third area consists of the first area and the second area. The display control method includes detecting and executing. In the detecting, an operation performed in the first area and the third area by a user is detected. In the executing, the function is executed when a duration during which the operation is detected has reached a response period. A first response period is used as the response period when the operation is performed in the first area. A second response period is used as the response period when the operation is performed in the third area. The first response period is shorter than the second response period.

An image forming apparatus according to another aspect of the present disclosure is an image forming apparatus for displaying a plurality of objects on a display. A function is assigned to at least one of the objects. The one object has an area including a first area, a second area, and a third area. The second area is different from the first area. The third area consists of the first area and the second area. The image forming apparatus includes a detection section and an execution section. The detection section detects an operation performed in the first area and the third area by a user. The execution section executes the function when a duration during which the detection section keeps detecting the operation has reached a response period. A first response period is used as the response period when the operation is performed in the first area. A second response period is used as the response period when the operation is performed in the third area. The first response period is shorter than the second response period.

DETAILED DESCRIPTION

Figure 1:
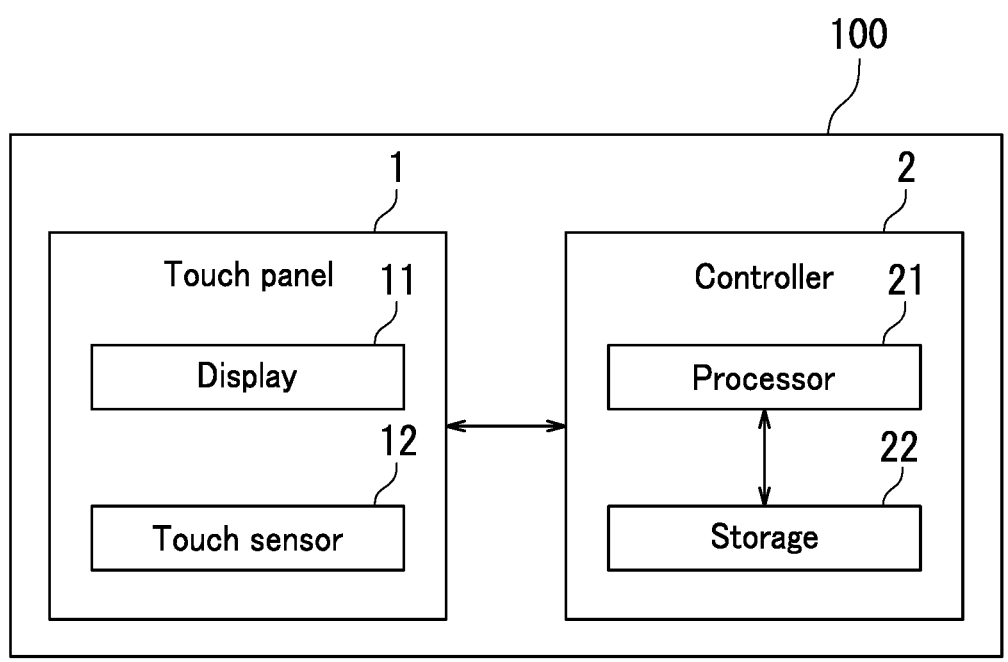
FIG. 1 is a diagram illustrating an example of a configuration of a tablet terminal device according to an embodiment of the present disclosure.

The following describes embodiments of the present disclosure with reference to the drawings (FIGS. 1 to 8). Elements in the drawings that are the same or equivalent are marked by the same reference signs, and description thereof will not be repeated.

First, a configuration of a tablet terminal device 100 according to an embodiment of the present disclosure will be described with reference to FIG. 1. FIG. 1 is a diagram illustrating an example of the configuration of the tablet terminal device 100.

As illustrated in FIG. 1, the tablet terminal device 100 includes a touch panel 1 and a controller 2. The tablet terminal device 100 is equivalent to an example of what may be referred to as a "display control device". The touch panel 1 displays images and receives operations from a user. The controller 2 controls operation of the touch panel 1.

The touch panel 1 includes a display 11 and a touch sensor 12. The display 11 displays images. The touch sensor 12 detects a touch position of a physical object on the touch panel 1. Specifically, the touch sensor 12 detects a position of an operation on the touch panel 1 by a user. The touch sensor 12 is for example disposed over a display surface of the display 11.

The controller 2 includes a processor 21 and storage 22. The processor 21 for example includes a central processing unit (CPU). The storage 22 includes memory such as semiconductor memory. The storage 22 may include a hard disk drive (HDD). A control program is stored in the storage 22.

Figure 2:
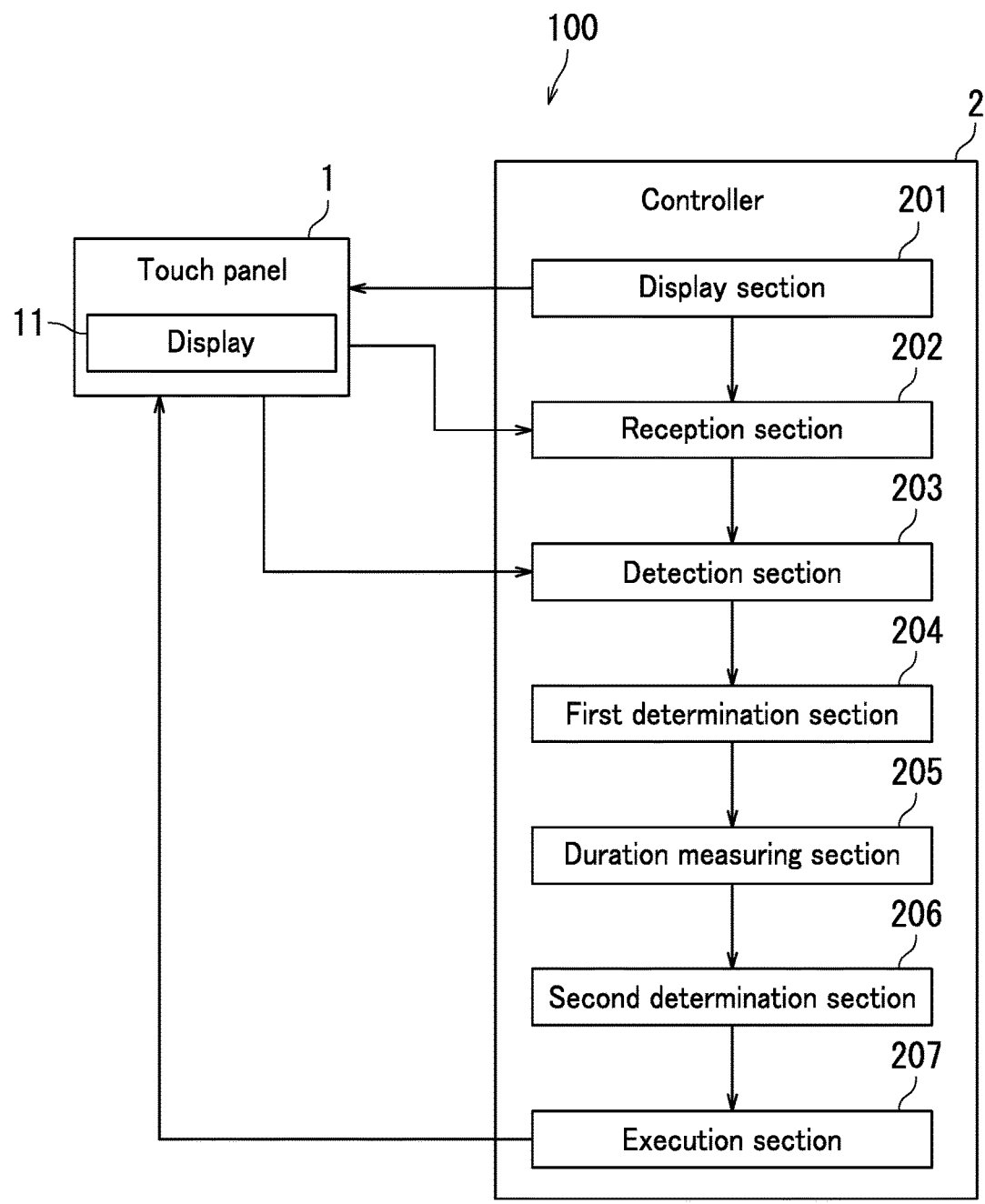
FIG. 2 is a diagram illustrating an example of a configuration of a controller.

The following describes a configuration of the controller 2 with reference to FIGS. 1 and 2. FIG. 2 is a diagram illustrating an example of the configuration of the controller 2. The controller 2 includes a display section 201, a reception section 202, a detection section 203, a first determination section 204, a duration measuring section 205, a second determination section 206, and an execution section 207. Specifically, the processor 21 functions as the display section 201, the reception section 202, the detection section 203, the first determination section 204, the duration measuring section 205, the second determination section 206, and the execution section 207 by reading and executing the control program stored in the storage 22.

The display section 201 displays a plurality of objects BJ on the display 11. The objects BJ for example exhibit button objects.

The reception section 202 receives an "operation" on, for example, one object BJ1 of the objects BJ displayed on the display 11. The "operation" is for example a touch operation OP. In the following description, the one object BJ1 may be referred to as a first object BJ1.

The first object BJ1 has a first area AR and a second area BR. The first area AR and the second area BR are described below with reference to FIG. 4.

When the reception section 202 receives the touch operation OP, the detection section 203 detects the touch operation OP performed in the first area AR or in the second area BR by the user. Specifically, the detection section 203 detects an operation position TP within an area of the first object BJ1. The operation position TP is a location where the touch operation OP is performed.

The first determination section 204 determines whether or not the operation position TP is within the first area AR of the first object BJ1. The first determination section 204 also determines whether or not the operation position TP is within the area of the first object BJ1.

The duration measuring section 205 measures a first operation duration PD1 when the first determination section 204 determines that the operation position TP is within the first area AR. The first operation duration PD1 refers to a period of time during which the detection section 203 keeps detecting the operation position TP within the first area AR. Specifically, the first operation duration PD1 refers to a period of time during which the detection section 203 keeps detecting the operation position TP within the first area AR without interruption.

When the first determination section 204 determines that the operation position TP is within the area of the first object BJ1, the duration measuring section 205 measures a second operation duration PD2. The second operation duration PD2 refers to a period of time during which the detection section 203 keeps detecting the operation position TP within the area of the first object BJ1. Specifically, the second operation duration PD2 refers to a period of time during which the detection section 203 keeps detecting the operation position TP within the area of the first object BJ1 without interruption. The area of the first object BJ1 is equivalent to what may be referred to as a "third area".

The second determination section 206 determines whether or not the first operation duration PD1 is equal to or longer than a first response period PDA. The first response period PDA refers to a response period based on the first operation duration PD1. Specifically, the first response period PDA is a period of time from reception of the touch operation OP in the first area AR by the user until the initiation of execution of a function assigned to the first object BJ1. The second determination section 206 also determines whether or not the second operation duration PD2 is equal to or longer than a second response period PDB. The second response period PDB refers to a response period based on the second operation duration PD2. Specifically, the second response period PDB is a period of time from reception of the touch operation OP on the first object BJ1 by the user until the initiation of execution of the function assigned to the first object BJ1.

The execution section 207 executes the function assigned to the first object BJ1 when the first operation duration PD1 has reached the first response period PDA. Specifically, the execution section 207 executes processing corresponding to the function assigned to the first object BJ1 when the second determination section 206 determines that the first operation duration PD1 is equal to or longer than the first response period PDA. The execution section 207 for example displays a copy screen on the display 11. The copy screen is a screen where copy settings are configured. That is, the "function assigned to the first object BJ1" is for example a function of displaying the copy screen on the display 11.

The execution section 207 also executes the function assigned to the first object BJ1 when the second operation duration PD2 has reached the second response period PDB. Specifically, the execution section 207 executes the processing corresponding to the function assigned to the first object BJ1 when the second determination section 206 determines that the second operation duration PD2 is equal to or longer than the second response period PDB.

According to the embodiment of the present disclosure, as described above with reference to FIGS. 1 and 2, the execution section 207 executes the function assigned to the first object BJ1 when the first operation duration PD1 has reached the first response period PDA. The first operation duration PD1 refers to a period of time during which the detection section 203 keeps detecting the touch operation OP in the first area AR by the user. The execution section 207 also executes the function assigned to the first object BJ1 when the second operation duration PD2 has reached the second response period PDB. The second operation duration PD2 refers to a period of time during which the detection section 203 keeps detecting the touch operation OP within the area of the first object BJ1 by the user. The first response period PDA is shorter than the second response period PDB. It is therefore possible to improve operability while eliminating or minimizing miss-detection of the operation by setting an appropriate area as the first area AR. For example, it is possible to improve operability while eliminating or minimizing miss-detection of the operation by setting an area at or around the center of the first object BJ1 as the first area AR.

The execution section 207 executes the function assigned to the first object BJ1 when the first operation duration PD1 is equal to or longer than the first response period PDA. The first operation duration PD1 refers to a period of time during which the detection section 203 keeps detecting the operation position TP within the first area AR of the first object BJ1. The operation position TP is a location within the area of the first object BJ1 where the touch operation OP is performed. The execution section 207 therefore executes the function assigned to the first object BJ1 when the touch operation OP is performed in the first area AR and the first operation duration PD1 is equal to or longer than the first response period PDA. It is therefore possible to improve operability while eliminating or minimizing miss-detection of the operation by setting a short response period (for example, 0.3 seconds) as the first response period PDA.

The detection section 203 detects the touch operation OP as the "operation" through the touch sensor 12. In a situation in which the "operation" is the touch operation OP, the operation position TP may be off an intended location due to a tremor of the user's hand H or a trembling of the user's body. That is, in a situation in which there is a tremor of the user's hand H or a trembling of the user's body, it is difficult to locate the operation position TP in the first area AR. In such a situation, the first operation duration PD1 is less likely to be equal to or longer than the first response period PDA. A tremor of the user's hand H for example occurs in a situation in which the user is an elderly person. A trembling of the user's body for example occurs in a situation in which the user is on board a vehicle such as a car or a train.

In a situation in which there is no tremor of the user's hand H or no trembling of the user's body, it is easy to locate the operation position TP in the first area AR, and therefore the first operation duration PD1 is likely to be equal to or longer than the first response period PDA. In such a situation, the effect of the present disclosure is manifest. That is, in a situation in which the touch operation OP is performed in the first area AR, it is possible to improve operability while eliminating or minimizing miss-detection of the operation by setting a short response period (for example, 0.3 seconds) as the first response period PDA.

Although the "operation" in the embodiment of the present disclosure is the touch operation OP, the present disclosure is not limited thereto. It is only necessary that the "operation" is performed on the one object BJ1. In an embodiment, for example, the "operation" may be a hard press operation.

Figure 3:
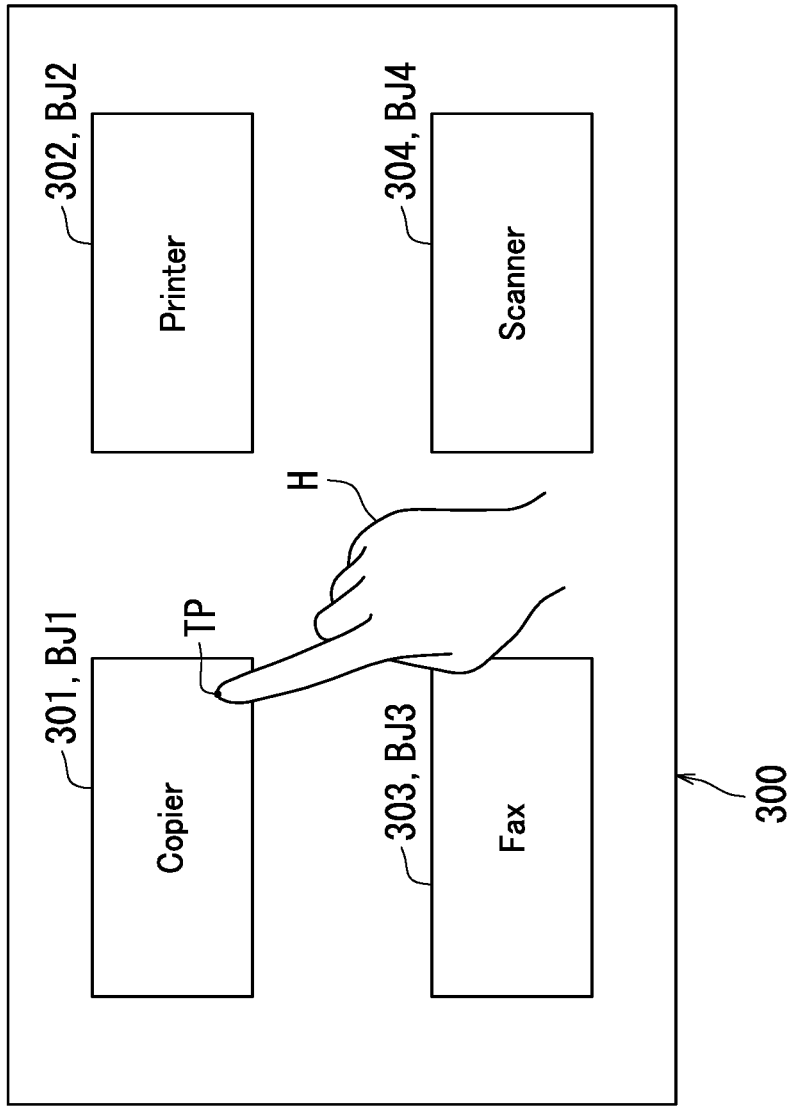
FIG. 3 is a screen diagram illustrating an example of an operation screen.

The following describes an operation screen 300 with reference to FIGS. 1 to 3. FIG. 3 is a screen diagram illustrating an example of the operation screen 300. As illustrated in FIG. 3, a copier button 301, a printer button 302, a fax button 303, and a scanner button 304 are displayed on the operation screen 300. The copier button 301, the printer button 302, the fax button 303, and the scanner button 304 are equivalent to the plurality of objects BJ.

Figure 8:
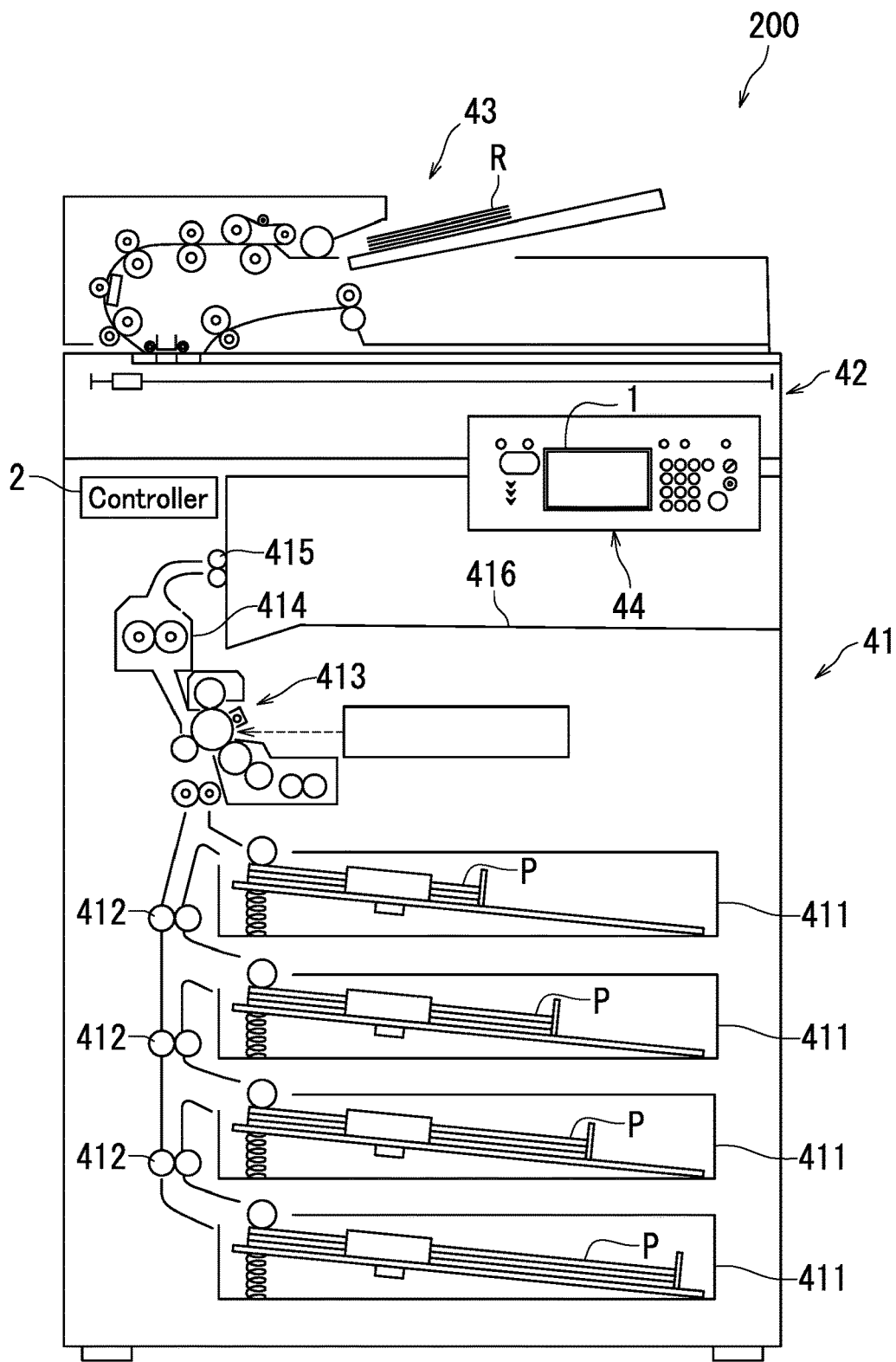
FIG. 8 is a diagram illustrating an example of a configuration of an image forming apparatus according to the embodiment of the present disclosure.

The tablet terminal device 100 according to the embodiment of the present disclosure is communicatively connected with an image forming apparatus 200 (see FIG. 8). The image forming apparatus 200 is a multifunction peripheral. The image forming apparatus 200 has a copying function, a printing function, a facsimile function, and a scanning function.

The display section 201 displays the operation screen 300 on the display 11. The copier button 301, the printer button 302, the fax button 303, and the scanner button 304 are equivalent to an example of the plurality of objects BJ. The term "plurality of" according to the embodiment of the present disclosure indicates the number "four".

The user performs the touch operation OP on the copier button 301 when the user is to use the copying function. The copier button 301 corresponds to the first object BJ1.

The user performs the touch operation OP on the printer button 302 when the user is to use the printing function. The printer button 302 may be referred to below as a second object BJ2.

The user performs the touch operation OP on the fax button 303 when the user is to use the facsimile function. The fax button 303 may be referred to below as a third object BJ3.

The user performs the touch operation OP on the scanner button 304 when the user is to use the scanning function. The scanner button 304 may be referred to below as a fourth object BJ4.

In the embodiment of the present disclosure, the user performs the touch operation OP on the copier button 301. Specifically, the user touches the operation position TP within an area of the displayed copier button 301 using the forefinger of the user's hand H. The detection section 203 detects the operation position TP in the area of the copier button 301. The operation position TP is a location where the touch operation OP is performed.

Figure 4:
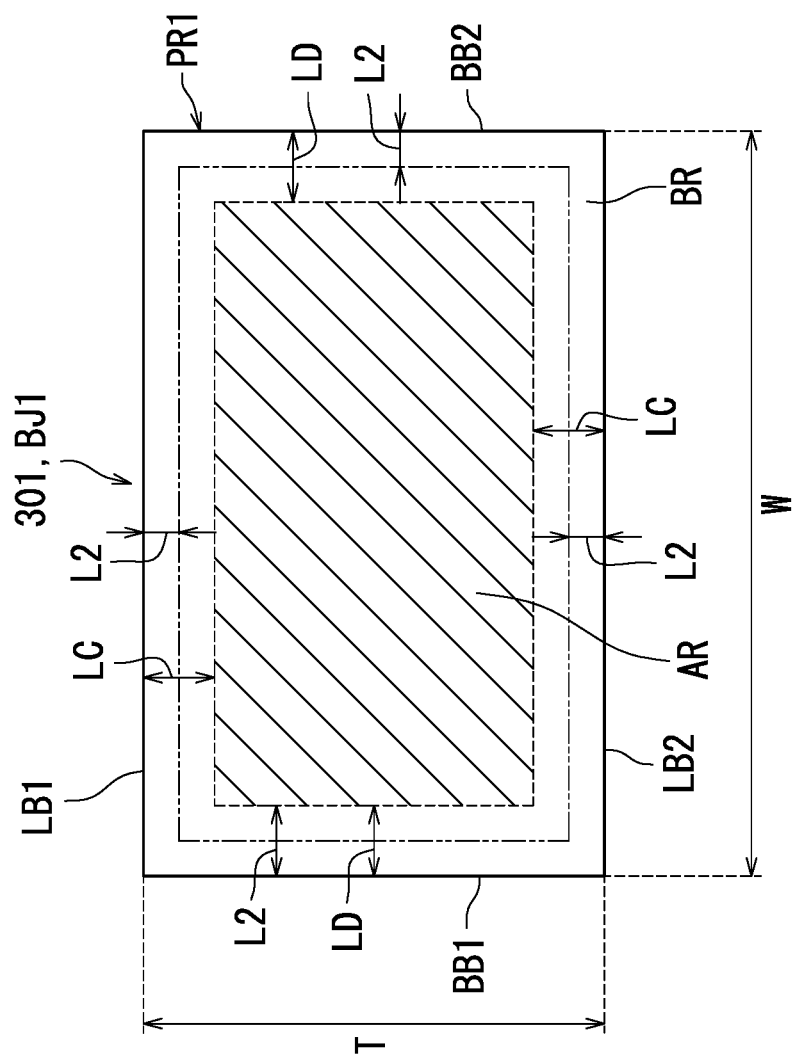
FIG. 4 is a diagram illustrating an example of a first area and a second area of a first object.

The following describes the first area AR and the second area BR with reference to FIGS. 1 to 4. FIG. 4 is a diagram illustrating an example of the first area AR and the second area BR of the first object BJ1. As illustrated in FIG. 4, the size of the first object BJ1 is represented by a height T and a width W. The height T is a length of the first object BJ1 in an up-down direction of the touch panel 1. The width W is a length of the first object BJ1 in a left-right direction of the touch panel 1.

The first area AR is a portion of the area of the first object BJ1. For example, the first area AR is a portion of the area of the copier button 301 displayed on the touch panel 1. The extent of the first area AR is distinguished using hatching. The second area BR is a remaining portion of the area of the first object BJ1 except the first area AR.

A distance LC and a distance LD between a perimeter PR1 of the first object BJ1 and the first area AR are each equal to or greater than a second distance L2. The distance LC is a distance between the perimeter PR1 of the first object BJ1 and the first area AR in the up-down direction of the touch panel 1. Specifically, the perimeter PR1 includes an upper side LB1, a lower side LB2, a left side BB1, and a right side BB2. The distance LC is a distance between the upper side LB1 of the first object BJ1 and an edge (upper edge) of the first area AR that is located toward the upper side LB1. The distance LC is a distance between the lower side LB2 and an edge (lower edge) of the first area AR that is located toward the lower side LB2.

The distance LD is a distance between the perimeter PR1 of the first object BJ1 and the first area AR in the left-right direction of the touch panel 1. Specifically, the distance LD is a distance between the left side BB1 and an edge (left edge) of the first area AR that is located toward the left side BB1. The distance LD is a distance between the right side BB2 and an edge (right edge) of the first area AR that is located toward the right side BB2.

The second distance L2 is for example predetermined based on the size of the first object BJ1. The second distance L2 is equivalent to what may be referred to as a "specific threshold distance". The size of the first object BJ1 includes the height T and the width W. The second distance L2 is for example determined based on the size of the first object BJ1.

According to the embodiment of the present disclosure, as described above with reference to FIGS. 1 to 4, the distance LC and the distance LD between the perimeter PR1 of the first object BJ1 and the first area AR are each equal to or greater than the second distance L2. As long as the second distance L2 is large enough, it is unlikely that the touch operation OP that has been performed at or around the center of the first object BJ1 is a mistaken operation. It is therefore possible to quickly determine that the touch operation OP has been performed by setting a short response period (for example, 0.3 seconds) as the first response period PDA.

Although the objects BJ in the embodiment of the present disclosure are button objects, the present disclosure is not limited thereto. The objects BJ may be any objects other than button objects. In an embodiment, for example, the objects BJ may exhibit icons. In another embodiment, for example, the objects BJ may exhibit shortcuts.

Although the second area BR in the embodiment of the present disclosure is a remaining portion of the area of the first object BJ1 except the first area AR, the present disclosure is not limited thereto. It is only necessary that the second area BR is different from the first area AR within the area of the first object BJ1. In an embodiment, for example, the second area BR may be an area within a distance not greater than the second distance L2 from the perimeter PR1 of the first object BJ1 in the up-down direction and the left-right direction. In such an embodiment, the first determination section 204 determines whether or not the operation position TP is located within a third area. The third area consists of the first area AR and the second area BR. The duration measuring section 205 measures the second operation duration PD2 when the first determination section 204 determines that the operation position TP is within the third area.

Figure 5:
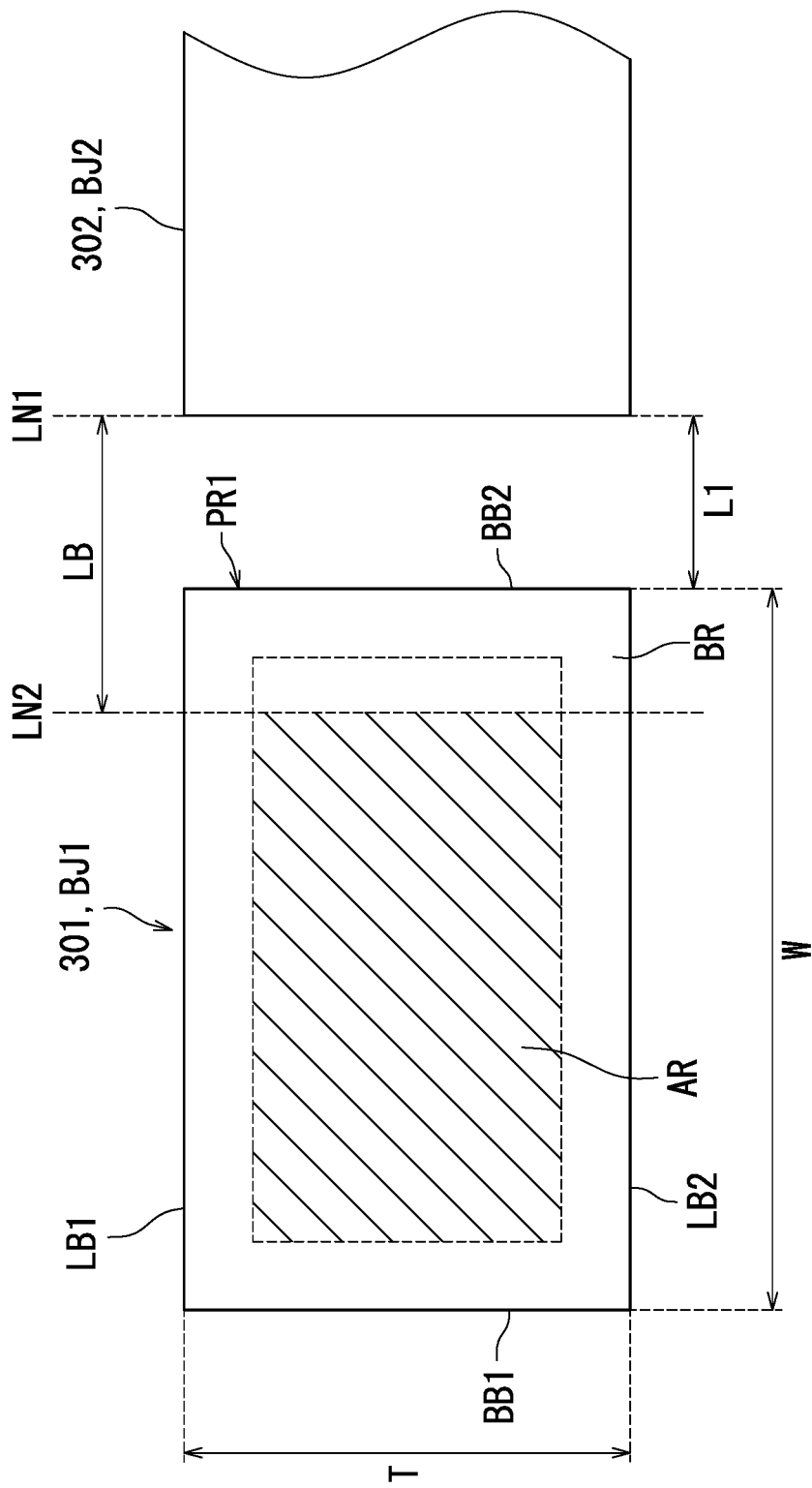
FIG. 5 is a diagram illustrating another example of the first area and the second area of the first object that is different from the example illustrated in FIG. 4.

The following further describes the first area AR and the second area BR with reference to FIGS. 1 to 5. FIG. 5 is a diagram illustrating another example of the first area AR and the second area BR of the first object BJ1 that is different from the example illustrated in FIG. 4. The first object BJ1 illustrated in FIG. 5 is different from the first object BJ1 illustrated in FIG. 4 in that the first object BJ1 illustrated in FIG. 5 is adjacent to the second object BJ2.

Like the first area AR illustrated in FIG. 4, the distance between the perimeter PR1 of the first object BJ1 and the first area AR illustrated in FIG. 5 is equal to or greater than the second distance L2.

The first area AR is a portion of the area of the first object BJ1. For example, the first area AR is a portion of the area of the copier button 301 displayed on the touch panel 1. The extent of the first area AR is distinguished using hatching. The second area BR is a remaining portion of the area of the first object BJ1 except the first area AR.

As illustrated in FIG. 5, a distance LB between the first area AR of the first object BJ1 and the other objects BJ is equal to or greater than a first distance L1. The first distance L1 is a distance between the first object BJ1 and the other objects BJ. Specifically, the other objects BJ are the second object BJ2, the third object BJ3, and the fourth object BJ4. In other words, the other objects BJ are the printer button 302, the fax button 303, and the scanner button 304. FIG. 5 does not show the fax button 303 or the scanner button 304.

The distance LB is a distance between a straight line LN1 and a straight line LN2. The straight line LN1 indicates an edge of the second object BJ2 that is located toward the first object BJ1. The straight line LN2 indicates an edge of the first area AR that is located toward the second object BJ2.

The first distance L1 is for example a distance between the copier button 301 and the printer button 302. Specifically, the first distance L1 is a distance between an edge (right edge) of the copier button 301 that is located toward the printer button 302 and an edge (left edge) of the printer button 302 that is located toward the copier button 301.

According to the embodiment of the present disclosure, as described above with reference to FIGS. 1 to 5, the distance LB between the first area AR of the first object BJ1 and the second to fourth objects BJ2 to BJ4 is equal to or greater than the first distance L1. The first distance L1 is a distance between the first object BJ1 and each of the second to fourth objects BJ2 to BJ4. It is therefore unlikely that the touch operation OP that has been performed is meant to be on any one of the second to fourth objects BJ2 to BJ4 as long as the distance LB is large enough. The distance LB being large enough for example means the following situation. That is, the straight line LN2 is closer to the center of the first object BJ1 than an edge of the first area AR that is located distant from the second object BJ2 as illustrated in FIG. 5. In other words, the position of the straight line LN2 is determined such that the edge of the first area AR that is located toward the second object BJ2 is further distant from the straight line LN1 than that of the first area AR illustrated in FIG. 4. It is therefore possible to quickly determine that the touch operation OP has been performed while eliminating or minimizing miss-detection of the operation by setting a short response period (for example, 0.3 seconds) as the first response period PDA.

Figure 6:
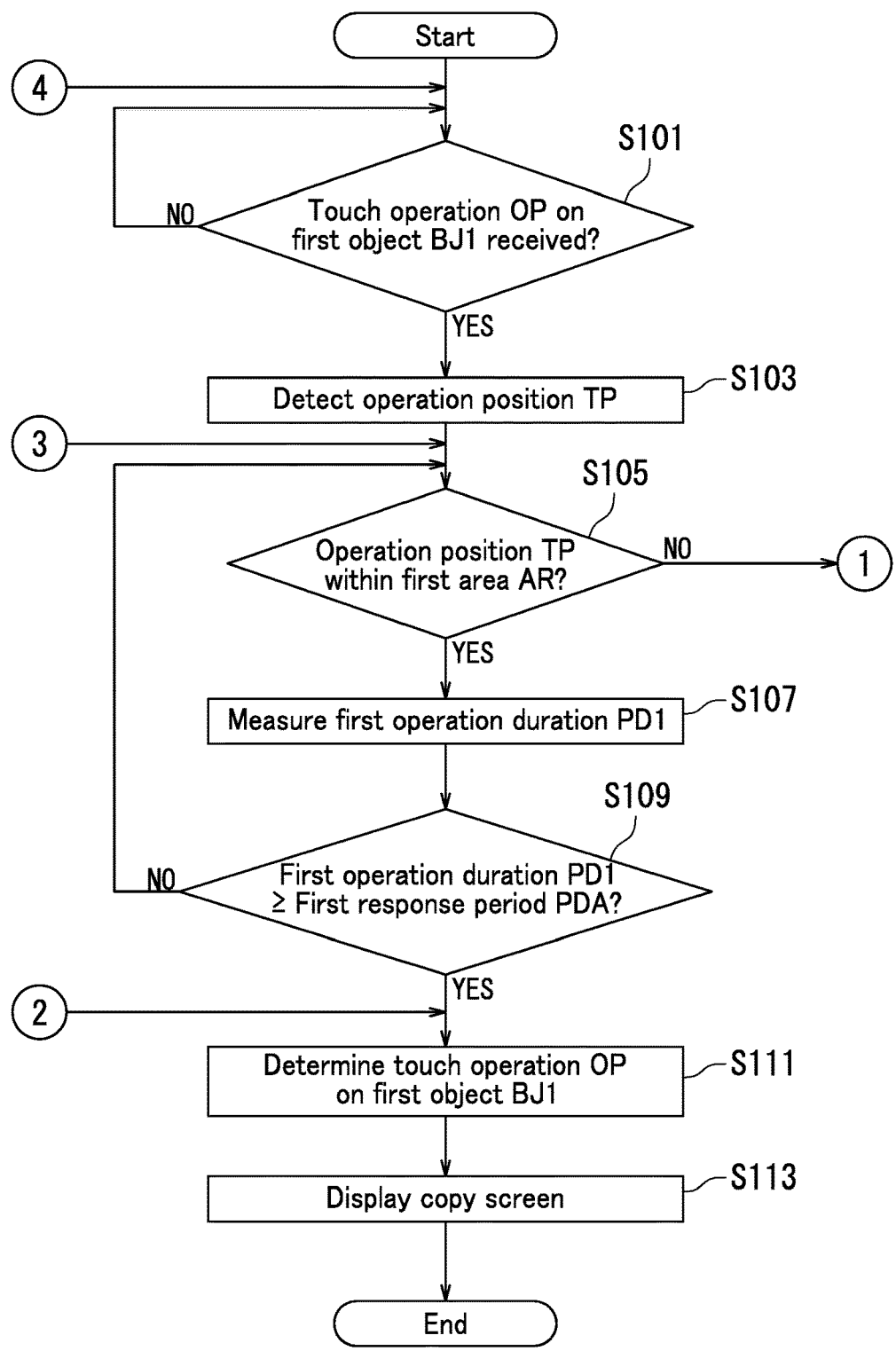
FIG. 6 is a flowchart illustrating an example of a process of the controller.
Figure 7:
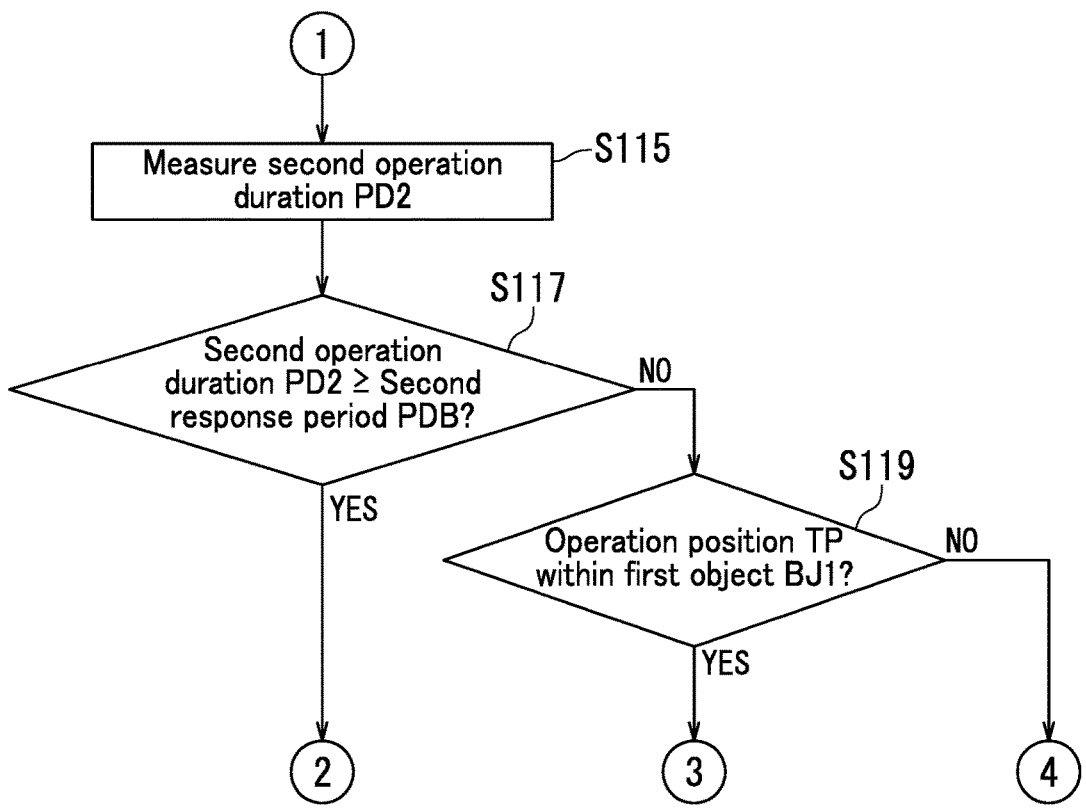
FIG. 7 is a flowchart illustrating the example of the process of the controller.

The following describes a process of the controller 2 with reference to FIGS. 1 to 7. FIGS. 6 and 7 are a flowchart illustrating an example of the process of the controller 2. The present embodiment is described using an example in which the operation screen 300 illustrated in FIG. 3 is initially displayed on the display 11. That is, the first to fourth objects BJ1 to BJ4 are displayed on the display 11.

First, in step S101, it is determined whether or not the reception section 202 has received the touch operation OP on the first object BJ1 as illustrated in FIG. 6.

When it is determined that the reception section 202 has not received the touch operation OP on the first object BJ1 (NO in step S101), the process is put into a standby state. When it is determined that the reception section 202 has received the touch operation OP on the first object BJ1 (YES in step S101), the process proceeds to step S103.

Next, in step S103, the detection section 203 detects the operation position TP in the area of the first object BJ1. The operation position TP is a location where the touch operation OP is performed.

Next, in step S105, the first determination section 204 determines whether or not the operation position TP is located within the first area AR of the first object BJ1.

When the first determination section 204 determines that the operation position TP is not located within the first area AR of the first object BJ1 (NO in step S105), the process proceeds to step S115 shown in FIG. 7. When the first determination section 204 determines that the operation position TP is located within the first area AR of the first object BJ1 (YES in step S105), the process proceeds to step S107.

Next, in step S107, the duration measuring section 205 measures the first operation duration PD1. The first operation duration PD1 refers to a period of time during which the detection section 203 keeps detecting the operation position TP within the first area AR.

Next, in step S109, the second determination section 206 determines whether or not the first operation duration PD1 is equal to or longer than the first response period PDA. The first response period PDA is for example 0.3 seconds.

When the second determination section 206 determines that the first operation duration PD1 is not equal to or longer than the first response period PDA (NO in step S109), the process returns to step S105. When the second determination section 206 determines that the first operation duration PD1 is equal to or longer than the first response period PDA (YES in step S109), the process proceeds to step S111.

Next, in step S111, the second determination section 206 determines that the touch operation OP has been performed on the first object BJ1.

Next, in step S113, the execution section 207 executes the function assigned to the first object BJ1. For example, the execution section 207 displays the copy screen on the display 11. The copy screen is a screen where copy settings are configured. The process then comes to an end.

When NO in step S105, the duration measuring section 205 measures the second operation duration PD2 in step S115 shown in FIG. 7. The second operation duration PD2 refers to a period of time during which the detection section 203 keeps detecting the operation position TP within the area of the first object BJ1.

Next, in step S117, the second determination section 206 determines whether or not the second operation duration PD2 is equal to or longer than the second response period PDB. The second response period PDB is longer than the first response period PDA. The second response period PDB is for example 3 seconds.

When the second determination section 206 determines that the second operation duration PD2 is equal to or longer than the second response period PDB (YES in step S117), the process proceeds to step S111 in FIG. 6. When the second determination section 206 determines that the second operation duration PD2 is not equal to or longer than the second response period PDB (NO in step S117), the process proceeds to step S119.

Next, in step S119, the controller 2 determines whether or not the operation position TP is located within the area of the first object BJ1.

When the controller 2 determines that the operation position TP is not located within the area of the first object BJ1 (NO in step S119), the process returns to step S101 in FIG. 6. When the controller 2 determines that the operation position TP is located within the area of the first object BJ1 (YES in step S119), the process returns to step S105 in FIG. 6.

Step S103 is equivalent to an example of what may be referred to as "detecting". Step S113 is equivalent to an example of what may be referred to as "executing".

According to the embodiment of the present disclosure, as described above with reference to FIGS. 1 to 7, it is determined that the touch operation OP has been performed on the first object BJ1 when the second operation duration PD2 is equal to or longer than the second response period PDB, which is longer than the first response period PDA. The second operation duration PD2 refers to a period of time during which the detection section 203 keeps detecting the operation position TP within the area of the first object BJ1. It is therefore possible to determine that the touch operation OP has been performed on the first object BJ1 even if the operation position TP is off an intended location due to a tremor of the user's hand or a trembling of the user's body. Furthermore, it is possible to eliminate or minimize miss-detection by setting the second response period PDB to an appropriate value (for example, 3 seconds).

<Image Forming Apparatus>

The following describes the image forming apparatus 200 according to the embodiment of the present disclosure with reference to FIG. 8. FIG. 8 is a diagram illustrating an example of a configuration of the image forming apparatus 200 according to the embodiment of the present disclosure. As illustrated in FIG. 8, the image forming apparatus 200 is a multifunction peripheral. The image forming apparatus 200 includes an image formation unit 41, an image reading unit 42, a document feed unit 43, an operation panel 44, and the controller 2.

The image formation unit 41 forms an image on paper P. The image reading unit 42 reads an image from a document R. The document feed unit 43 feeds the document R to the image reading unit 42. The operation panel 44 includes the touch panel 1 and receives an operation from a user.

The image formation unit 41 includes feed sections 411, conveyance sections 412, a formation execution section 413, a fixing section 414, an ejection section 415, and an exit tray.

The feed sections 411 feed the paper P to the respective conveyance sections 412. The conveyance sections 412 convey the paper P to the ejection section 415 via the formation execution section 413 and the fixing section 414.

The formation execution section 413 forms an image on the paper P. After the image is formed on the paper P, the fixing section 414 applies heat and pressure to the paper P to fix the image on the paper P. The ejection section 415 ejects the paper P out of the image forming apparatus 200.

The touch panel 1 has substantially the same configuration as the touch panel 1 of the tablet terminal device 100. The controller 2 has substantially the same configuration as the controller 2 of the tablet terminal device 100. That is, the controller 2 includes the display section 201, the reception section 202, the detection section 203, the first determination section 204, the duration measuring section 205, the second determination section 206, and the execution section 207. The image forming apparatus 200 therefore produces the same effects as the tablet terminal device 100. The image forming apparatus 200 is equivalent to an example of what may be referred to as a "display control device".

Through the above, embodiments of the present disclosure have been described with reference to the drawings. However, the present disclosure is not limited to the embodiments and the present disclosure can be implemented in various different forms within the intended scope thereof (for example, as described below in sections (1) and (2)). The drawings schematically illustrate elements of configuration in order to facilitate understanding and properties of elements of configuration illustrated in the drawings, such as thicknesses, lengths, and numbers thereof, may differ from actual properties thereof in order to facilitate preparation of the drawings. Furthermore, properties of elements of configuration described in the above embodiments, such as shapes and dimensions, are merely examples and are not intended as specific limitations. Various alterations may be made so long as there is no substantial deviation from the configuration of the present disclosure.

(1) As described with reference to FIGS. 1 to 8, the display control device is the tablet terminal device 100 or the image forming apparatus 200. However, the present disclosure is not limited thereto. It is only necessary that the display control device includes a display and a controller. In an embodiment, for example, the display control device may be a device such as a smartphone, a CD player, a DVD player, and various household electrical appliances. In another embodiment, for example, the display control device may be a car navigation system.

(2) As described with reference to FIGS. 1 to 8, the plurality of objects BJ is displayed on the operation screen 300. However, the present disclosure is not limited thereto. It is only necessary that the plurality of objects BJ is displayed on the display 11. In an embodiment, for example, the plurality of objects BJ may be displayed on an opening screen.

What is claimed is:

1. A display control device for displaying a plurality of objects on a display,
   at least one of the objects being a specific object assigned a function,
   the specific object having an area including a first area, a second area, and a third area, the second area being different from the first area, the third area consisting of the first area and the second area, the display control device comprising:

a detection section configured to detect an operation performed in the first area and the third area by a user; and an execution section configured to execute the function when a duration during which the detection section keeps detecting the operation has reached a response period, wherein a first response period is used as the response period when the operation is performed in the first area, a second response period is used as the response period when the operation is performed in the third area, the first response period is shorter than the second response period, a distance between a perimeter of the specific object and the first area is equal to or greater than a predetermined threshold distance, the threshold distance is a distance determined based on a size of the specific object, and the size indicates a height and a width of the specific object.

2. The display control device according to claim 1, wherein the third area is the area of the specific object.

3. The display control device according to claim 1, wherein a distance between the first area and an object other than the specific object among the objects is greater than a distance between the specific object and the object other than the specific object.

4. The display control device according to claim 1, further comprising a touch sensor, wherein the detection section detects a touch operation as the operation through the touch sensor.

5. The display control device according to claim 1, further comprising:

a first determination section configured to determine whether or not an operation position is within the first area, the operation position being a location where the operation is performed;

a duration measuring section configured to measure a first operation duration during which the operation position is within the first area; and a second determination section configured to determine whether or not the first operation duration is equal to or longer than the first response period, wherein the detection section detects the operation position, and the execution section executes the function when the second determination section determines that the first operation duration is equal to or longer than the first response period.

6. The display control device according to claim 1, wherein each of the objects exhibits a button object, and functions different from one another are assigned to the respective objects.

7. A display control device for displaying a plurality of objects on a display, at least one of the objects being assigned a function, the one object having an area including a first area, a second area, and a third area, the second area being different from the first area, the third area consisting of the first area and the second area, the display control device comprising:

a detection section configured to detect an operation performed in the first area and the third area by a user;

a first determination section configured to determine whether or not an operation position is within the first area, the operation position being a location where the operation is performed;

a duration measuring section configured to measure a first operation duration during which the operation position is within the first area;

a second determination section configured to determine whether or not the first operation duration is equal to or longer than a first response period; and an execution section configured to execute the function when the second determination section determines that the first operation duration is equal to or longer than the first response period, wherein the first determination section determines whether or not the operation position is within the third area, the duration measuring section measures a second operation duration during which the operation position is within the third area, the second determination section determines whether or not the second operation duration is equal to or longer than a second response period, the execution section executes the function when the second determination section determines that the second operation duration is equal to or longer than the second response period, the first response period is used when the operation is performed in the first area, the second response period is used when the operation is performed in the third area, and the first response period is shorter than the second response period.

8. A display control method for implementation by a display control device for displaying a plurality of objects on a display, at least one of the objects being assigned a function, the one object having an area including a first area, a second area, and a third area, the second area being different from the first area, the third area consisting of the first area and the second area, the display control method comprising:

detecting, through the display control device, an operation performed in the first area and the third area by a user; and executing, through the display control device, the function when a duration during which the operation is detected has reached a response period, wherein a first response period is used as the response period when the operation is performed in the first area, a second response period is used as the response period when the operation is performed in the third area, the first response period is shorter than the second response period, a distance between a perimeter of the one object and the first area is equal to or greater than a predetermined threshold distance, the threshold distance is a distance determined based on a size of the one object, and the size indicates a height and a width of the one object.

9. A display control method for implementation by a display control device for displaying a plurality of objects on a display, at least one of the objects being assigned a function, the one object having an area including a first area, a second area, and a third area, the second area being different from the first area, the third area consisting of the first area and the second area, the display control method comprising:

detecting, through the display control device, an operation performed in the first area by a user;

determining, through the display control device, whether or not an operation position is within the first area, the operation position being a location where the operation is performed;

measuring, through the display control device, a first operation duration during which the operation position is within the first area;

determining, through the display control device, whether or not the first operation duration is equal to or longer than a first response period;

executing, through the display control device, the function when the first operation duration is equal to or longer than the first response period;

detecting, through the display control device, an operation performed in the third area by the user;

determining, through the display control device, whether or not an operation position is within the third area, the operation position being a location where the operation is performed;

measuring, through the display control device, a second operation duration during which the operation position is within the third area;

determining, through the display control device, whether or not the second operation duration is equal to or longer than a second response period; and executing, through the display control device, the function when the second operation duration is equal to or longer than the second response period, wherein the first response period is used when the operation is performed in the first area, the second response period is used when the operation is performed in the third area, and the first response period is shorter than the second response period.

* * * * *